United States Patent
Saeki

(10) Patent No.: US 12,032,039 B2
(45) Date of Patent: Jul. 9, 2024

(54) SOLDER JOINT LIFE PREDICTOR AND SOLDER JOINT LIFE PREDICTION METHOD

(71) Applicant: Mitsubishi Electric Corporation, Tokyo (JP)

(72) Inventor: Takuya Saeki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 408 days.

(21) Appl. No.: 17/422,329

(22) PCT Filed: Jan. 18, 2019

(86) PCT No.: PCT/JP2019/001505
§ 371 (c)(1),
(2) Date: Jul. 12, 2021

(87) PCT Pub. No.: WO2020/148896
PCT Pub. Date: Jul. 23, 2020

(65) Prior Publication Data
US 2022/0105583 A1  Apr. 7, 2022

(51) Int. Cl.
*G01R 31/71* (2020.01)
*B23K 3/08* (2006.01)
(Continued)

(52) U.S. Cl.
CPC .............. *G01R 31/71* (2020.01); *B23K 3/08* (2013.01); *G01N 3/60* (2013.01); *H05K 1/0268* (2013.01);
(Continued)

(58) Field of Classification Search
CPC ........ B23K 3/08; B23K 2101/40; G01N 3/60; G01N 2203/0224; H05K 1/0268;
(Continued)

(56) References Cited

U.S. PATENT DOCUMENTS 6,260,998 B1 * 7/2001 Garfinkel ........... G01R 31/2817
374/57
2004/0158450 A1   8/2004 Nakadate et al.
(Continued)

FOREIGN PATENT DOCUMENTS

JP    2002076071 A   3/2002
JP    2004045343 A   2/2004
(Continued)

OTHER PUBLICATIONS

Hectors et al. "Cumulative Damage and Life Prediction Models for High-Cycle Fatigue of Metals: A Review", 2021, Metals 2021, 11, 204 (Year: 2021).*
(Continued)

*Primary Examiner* — Nasima Monsur
*Assistant Examiner* — Dilara Sultana
(74) *Attorney, Agent, or Firm* — BUCHANAN INGERSOLL & ROONEY PC

(57) ABSTRACT

A control device including a solder joint life predictor includes: a temperature sensor that measures temperature of a solder joint on an electronic circuit board that drives a heater and a motor; a storage that stores a reference acceleration factor that is an acceleration factor based on a test condition of a thermal shock test and a reference condition in an environment in which the electrical appliance is used; a calculator that calculates an actual acceleration factor from a temperature variation range and a maximum reached temperature of the solder joint during one cycle from start to end of driving of the heater or the motor; and a determiner that predicts the life of the solder joint by comparing the integrated value of the acceleration factor ratios with a threshold.

13 Claims, 4 Drawing Sheets

(51) Int. Cl.
  *B23K 101/40* (2006.01)
  *G01N 3/60* (2006.01)
  *G06F 119/04* (2020.01)
  *H05K 1/02* (2006.01)

(52) U.S. Cl.
  CPC .. *B23K 2101/40* (2018.08); *G01N 2203/0224* (2013.01); *G06F 2119/04* (2020.01)

(58) Field of Classification Search
  CPC ............. H05K 2203/162; G01R 31/71; G01R 31/2642; G06F 2119/04
  See application file for complete search history.

(56) References Cited

U.S. PATENT DOCUMENTS

| | | | | |
|---|---|---|---|---|
| 2013/0067424 | A1* | 3/2013 | Yamamoto | G06F 30/23 702/34 |
| 2013/0275096 | A1* | 10/2013 | Yoshimura | G06F 30/23 703/2 |
| 2021/0318391 | A1* | 10/2021 | Cheim | G06F 30/3308 |

FOREIGN PATENT DOCUMENTS

| | | |
|---|---|---|
| JP | 2004237304 A | 8/2004 |
| JP | 2006254574 A | 9/2006 |
| JP | 2013221844 A | 10/2013 |

OTHER PUBLICATIONS

R. Dudek et al., "Solder fatigue acceleration prediction and testing results for different thermal test- and field cycling environments," Proceedings of the 5th Electronics System-integration Technology Conference (ESTC), Helsinki, Finland, 2014, pp. 1-8, (Year: 2014).*
A. Jinhua Mi, et al. "Thermal Cycling Life Prediction of Sn—3.0Ag—0.5Cu Solder Joint Using Type-I Censored Data", The Scientific World Journal vol. 2014, Article ID 807693, 11 pages (Year: 2014).*
International Search Report (PCT/ISA/210) and Written Opinion (PCT/ISA/237) mailed on Apr. 16, 2019, by the Japan Patent Office as the International Searching Authority for International Application No. PCT/JP2019/001505.

* cited by examiner

SOLDER JOINT LIFE PREDICTOR AND SOLDER JOINT LIFE PREDICTION METHOD

FIELD

The present invention relates to a solder joint life predictor and a solder joint life prediction method for life prediction of solder joints of electronic components.

BACKGROUND

Patent Literature 1 teaches a protection device that estimates power cycle lifetime on the basis of the junction temperature of a power semiconductor, and prompts a user to replace a component before destruction of a semiconductor element in an electronic circuit such as an inverter on which the power semiconductor, which causes heat generation, is installed.

CITATION LIST

Patent Literature

Patent Literature 1: Japanese Patent Application Laid-open No. 2006-254574

SUMMARY

Technical Problem

An electronic circuit includes not only a semiconductor element typified by a power semiconductor but also includes electronic components such as a mechanical relay, a resistor, and a capacitor. A crack generated in a solder joint of an electronic component and a circuit board is a cause of loss of a function of an electronic circuit. Thus, an electronic circuit loses its function not only when a semiconductor element is damaged but also when a crack is generated in a solder joint. Because the life of a solder joint is typically shorter than the power cycle lifetime of a semiconductor element, a crack is often generated in a solder joint on a circuit board and the function of the electronic circuit is lost before the semiconductor element comes to the end of the life. There have therefore been demands for prediction of the lives of solder joints to enable use of an electronic circuit to be stopped before a crack is generated in a solder joint and the function of the electronic circuit is lost.

The invention taught in Patent Literature 1 is to predict the life of a semiconductor element itself, and cannot predict the life of a solder joint.

The present invention has been made in view of the above, and an object thereof is to provide a solder joint life predictor capable of predicting the life of a solder joint.

Solution to Problem

To solve the above problems and achieve the object a solder joint life predictor according to the present invention includes: a temperature sensor to measure temperature of a solder joint on an electronic circuit board that drives a load; a storage to store a reference acceleration factor, the reference acceleration factor being an acceleration factor based on a test condition of a thermal shock test of an electrical appliance including the electronic circuit board and a reference condition in an environment in which the electrical appliance is used. The solder joint life predictor also includes: a calculator to calculate an actual acceleration factor on the basis of a temperature variation range and a maximum reached temperature of the solder joint during one cycle from start to end of driving of the load, and integrate acceleration factor ratios each obtained by dividing the actual acceleration factor by the reference acceleration factor for each one cycle from start to end of driving of the load to obtain an integrated value of the acceleration factor ratios; and a determiner to predict life of the solder joint by comparing an integrated value of the acceleration factor ratios with a threshold.

Advantageous Effects of Invention

A solder joint life predictor according to the present invention produces an effect of enabling prediction of the life of a solder joint.

DESCRIPTION OF EMBODIMENTS

A solder joint life predictor and a solder joint life prediction method according to an embodiment of the present invention will be described in detail below with reference to the drawings. Note that the present invention is not limited to the embodiment.

First Embodiment

Figure 1:
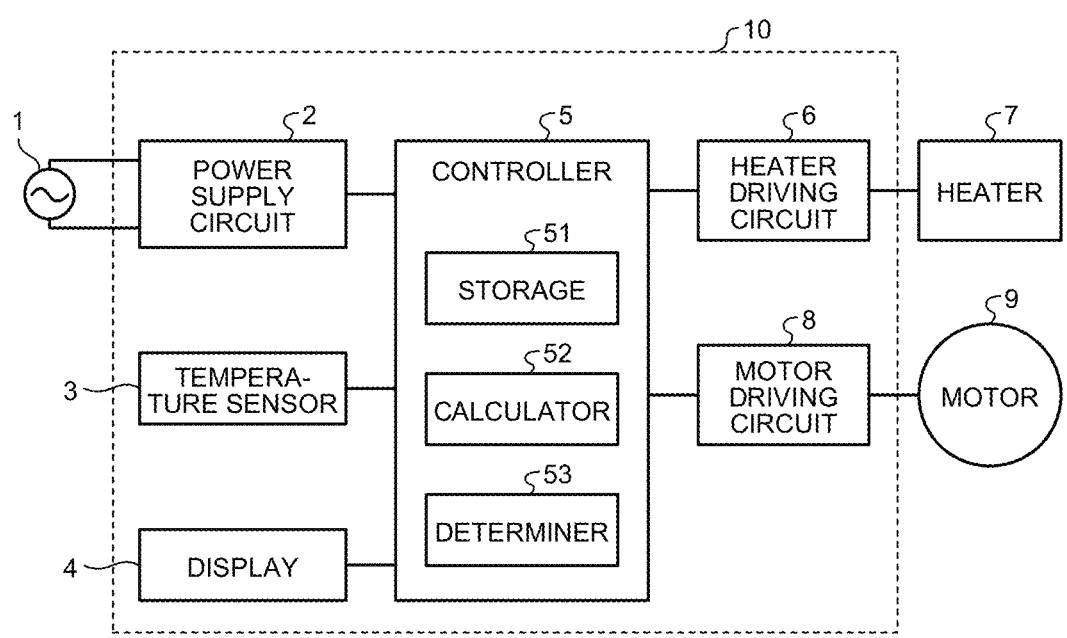
FIG. 1 is a functional block diagram of a control device including a solder joint life predictor according to a first embodiment of the present invention.

FIG. 1 is a functional block diagram of a control device including a solder joint life predictor according to a first embodiment of the present invention. A control device 10 includes: a controller 5 that controls a heater 7 via a heater driving circuit 6 and controls a motor 9 via a motor driving circuit 8; and a power supply circuit 2 that supplies power to the controller 5. The power supply circuit 2 converts an alternating-current voltage input from an alternating current power supply 1 into a direct-current voltage, and outputs the direct-current voltage to the controller 5. The controller 5 switches the heater 7 on and off by outputting signals to the heater driving circuit 6. In addition, the controller 5 drives the motor 9 by outputting signals to the motor driving circuit 8.

The control device 10 includes the heater driving circuit 6 and the motor driving circuit 8. The heater driving circuit 6 includes an element for driving the heater 7 which is a load. The motor driving circuit 8 includes an element for driving the motor 9 which is a load. The element for driving the heater 7 and the element for driving the motor 9 are connected to a printed circuit board by soldering. Specifically, solder joints are present between: the element for driving the heater 7, the element for driving the motor 9; and the printed circuit board. The element for driving the heater 7 and the element for driving the motor 9 may be relays or semiconductor elements. The element for driving the heater 7 and the element for driving the motor 9 may be selected on the basis of the numbers of times the heater 7 and the motor 9 are turned on and off and the temperatures of the heater 7 and the motor 9.

The control device 10 also includes: a temperature sensor 3 for measuring temperature around solder joints in the power supply circuit 2, in the heater driving circuit 6, and in the motor driving circuit 8; and a display 4 for displaying information. For the display 4, a liquid crystal device is applicable, but the display 4 is not limited thereto.

The controller 5 includes a storage 51 for storing a reference acceleration factor A0 which is an acceleration factor obtained based on: test conditions of a thermal shock test on an electrical appliance including an electronic circuit board having solder joints; and reference conditions in an environment in which the electrical appliance including the electronic circuit board is used. The controller 5 also includes a calculator 52. The calculator 52 calculates an actual acceleration factor A1 from a temperature variation range and a maximum reached temperature T1 of solder joints during one cycle from the start to the end of driving of a load; and integrates acceleration factor ratios A1/A0 each obtained by dividing the actual acceleration factor by the reference acceleration factor A0 in one cycle from the start to the end of driving the load to obtain an integrated value Σ(A1/A0) of the acceleration factor ratios. The controller 5 also includes a determiner 53 to predict the lives of the solder joints by comparing the integrated value Σ(A1/A0) of the acceleration factor ratios with a threshold. The controller 5 also includes a heater controller, which is not illustrated, for controlling the heater 7 via the heater driving circuit 6. The controller 5 also includes a motor controller, which is not illustrated, for controlling the motor 9 via the motor driving circuit 8.

In the first embodiment, the temperature sensor 3, the display 4, the storage 51, the calculator 52, and the determiner 53 constitute the solder joint life predictor. Thus, in the first embodiment, the solder joint life predictor is incorporated in the control device 10 that controls the heater 7 and the motor 9. The controller 5 of the control device 10 therefore also serves as a controller of the solder joint life predictor. The solder joint life predictor incorporated in the control device 10 predicts the lives of solder joints in the power supply circuit 2, the heater driving circuit 6, and the motor driving circuit 8. Note that, because the life of a solder joint tends to be shorter as the electric current flowing therethrough is higher and as the number of times of turning on and off is larger, the control device 10 preferably gives priority to life prediction of solder joints in the heater driving circuit 6 or the motor driving circuit 8 over life prediction of solder joints in the power supply circuit 2. Note that the solder joint life predictor may be configured as a separate device independent of the control device 10. Specifically, the solder joint life predictor may be a solder joint life prediction device connected externally to a device having solder joints subjected to life prediction.

Figure 2:
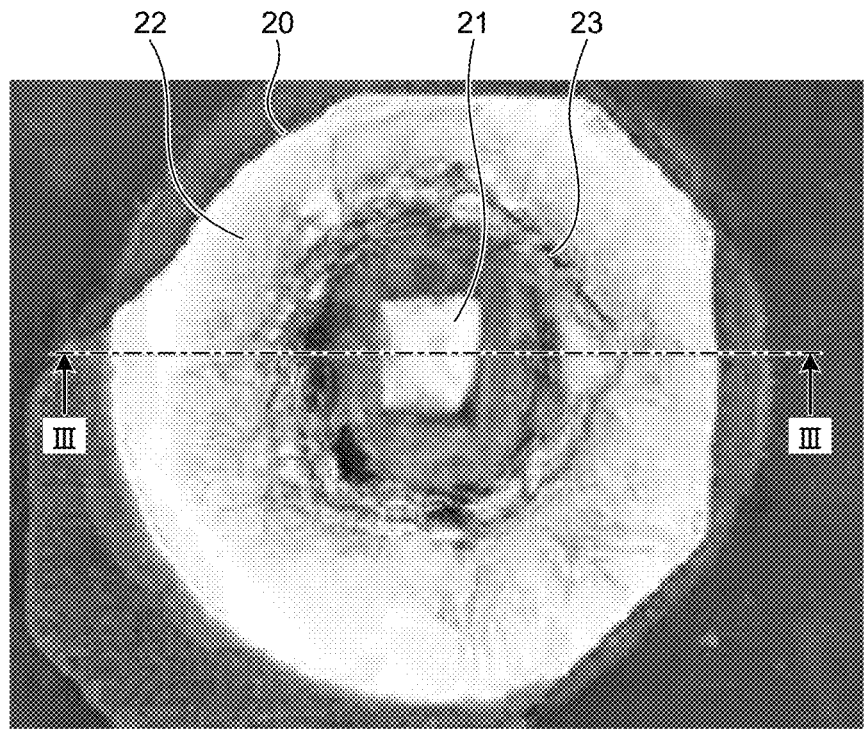
FIG. 2 is a plan view of a solder joint subjected to life prediction performed by the solder joint life predictor according to the first embodiment as viewed from a solder side of a circuit board.
Figure 3:
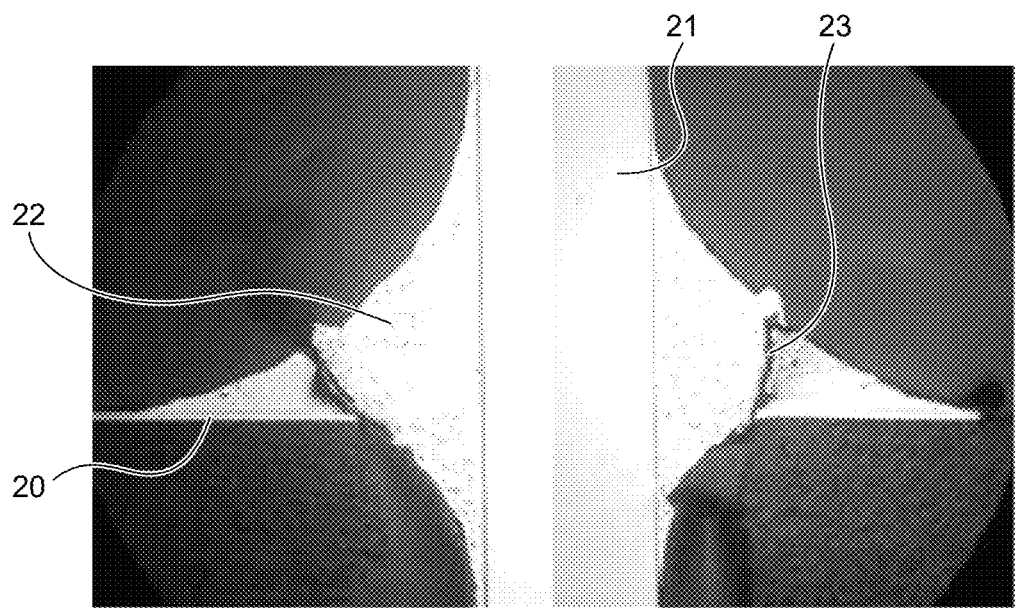
FIG. 3 is a cross-sectional view of the solder joint subjected to life prediction performed by the solder joint life predictor according to the first embodiment.

FIG. 2 is a plan view of a solder joint subjected to life prediction performed by the solder joint life predictor according to the first embodiment as viewed from a solder side of a circuit board. FIG. 3 is a cross-sectional view of the solder joint subjected to life prediction performed by the solder joint life predictor according to the first embodiment. FIG. 3 illustrates a cross section along line III-III in FIG. 2. The solder joint is a joint at which a conductor pattern 20 around a through hole on a board surface and a pin 21 that is an electronic component are joined with solder 22. A crack 23 is generated in the solder joint in FIG. 3, which decreases the cross-sectional area for current flow and increases the impedance. Thus, when electric current flows in the solder joint having the crack 23, the solder joint generates heat.

Figure 4:
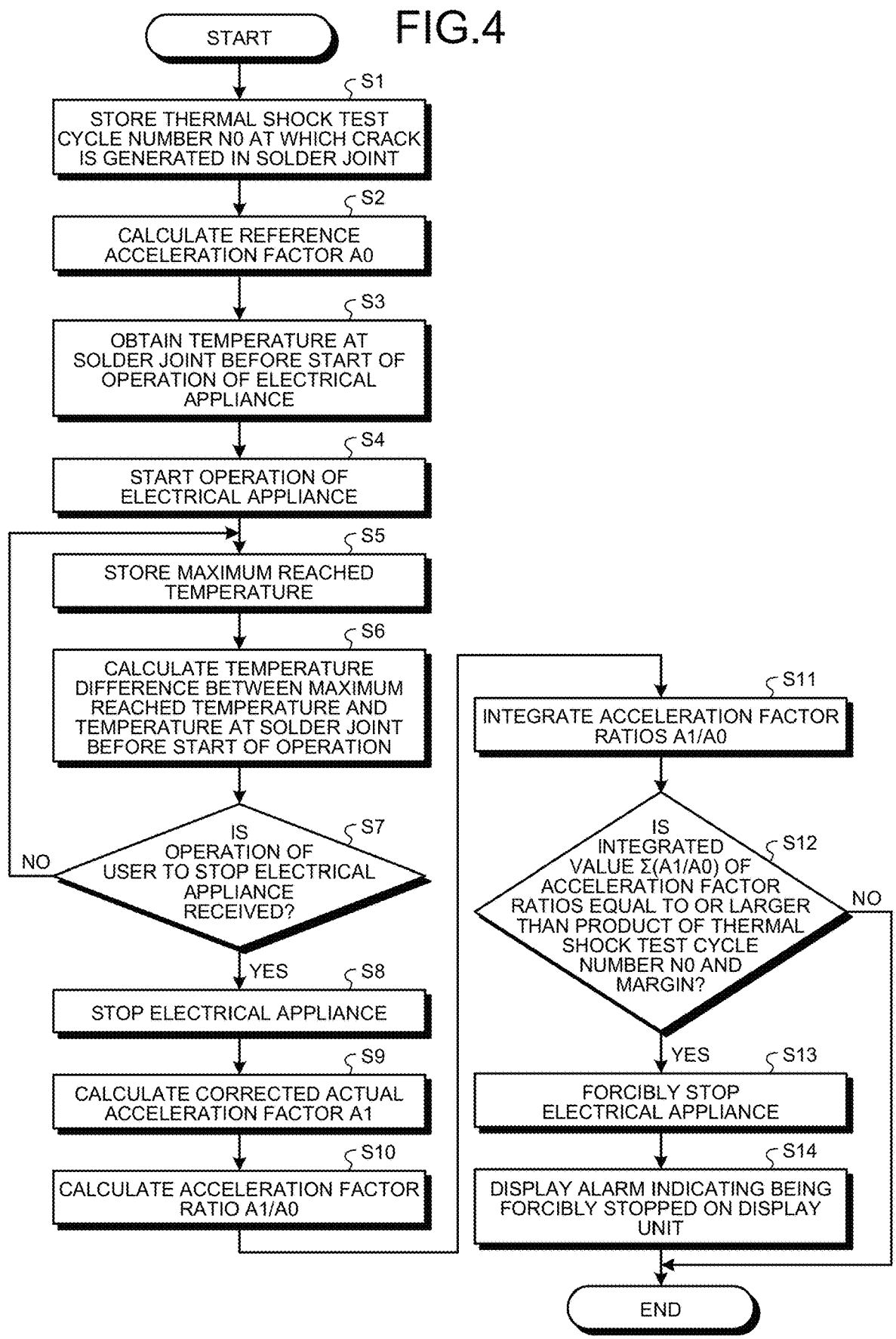
FIG. 4 is a flowchart illustrating a flow of operations for predicting the life of a solder joint by using the solder joint life predictor according to the first embodiment.

FIG. 4 is a flowchart illustrating a flow of operations for predicting the life of a solder joint by using the solder joint life predictor according to the first embodiment. In step S1, the controller 5 stores a thermal shock test cycle number N0 at which a crack 23 is generated in each solder joint in a thermal shock test during development of an electrical appliance including an electronic circuit board having solder joints. In step S2, the controller 5 calculates the reference acceleration factor A0 by the modified Coffin-Manson equation on the basis of a temperature condition that is a test condition of the thermal shock test of the electrical appliance and a reference temperature condition in an environment in which the electrical appliance is used. Note that the reference temperature condition in the environment in which the electrical appliance is used is a temperature condition in an assumption that the electrical appliance undergoes in the usage environment, and can be the temperature variation range of the solder joints and the maximum reached temperature of the solder joints, for example. The processes in steps S1 and S2 are performed before manufacturing of the electrical appliance.

In step S3, the controller 5 obtains the temperature T0 of the solder joints before start of operation of the electrical appliance from the temperature sensor 3. In step S4, the controller 5 starts operation of the electrical appliance in accordance with an operation by a user. When the operation of the electrical appliance is started, electric current flows in the solder joints. In step S5, the controller 5 stores the maximum reached temperature T1 on the basis of temperature information obtained from the temperature sensor 3. The maximum reached temperature T1 is a maximum reached temperature of each solder joint during one cycle from the start to the stop of the operation of the electrical appliance. Thus, the maximum reached temperature T1 is a maximum reached temperature of each solder joint during one cycle from the start to the end of driving of a load. In step S6, the controller 5 calculates a temperature difference T1−T0 between the maximum reached temperature T1 and the temperature T0 of the solder joint before the start of the operation. The temperature difference T1−T0 is a temperature variation range of the solder joint during one cycle from the start to the stop of the operation of the electrical appliance. In step S7, the controller 5 determines whether or not an operation from the user to stop the electrical appliance is received. If the operation of the user to stop the electrical appliance is received, the determination result is Yes in step S7, and the controller 5 stops the electrical appliance in step S8. If the operation of the user to stop the electrical appliance is not received, and the determination result is No in step S7, the process returns to step S5.

In step S9, after the electrical appliance is stopped in step S8, the controller 5 calculates the actual acceleration factor A1 by the modified Coffin-Manson equation by using: the temperature condition, which is a test condition in the thermal shock test of the actual appliance; the maximum reached temperature T1 of the solder joint; and the temperature difference T1-T0 of the solder joint. The actual acceleration factor A1 is an acceleration factor calculated on the basis of the temperature condition during one actual operation.

In step S10, the controller 5 calculates the acceleration factor ratio A1/A0. The acceleration factor ratio A1/A0 expresses a difference between the actual acceleration factor A1 under the actual temperature condition and the reference acceleration factor A0 under the reference temperature condition in each one actual operation.

In step S11, the controller 5 integrates the acceleration factor ratios A1/A0 for one cycle to obtain an integrated value $\Sigma(A1/A0)$ of the acceleration factor ratios. The acceleration factor ratios A1/A0 are integrated each time the operation and the stop of the electrical appliance is repeated. Note that an integrated value $\Sigma(A1/A0)$ of the acceleration factor ratios in n cycles from the start to the stop of operation of the electrical appliance expresses the difference in the acceleration factors in n cycles from the start to the stop of operation in a form of a ratio.

In step S12, the controller 5 predicts the life of the solder joint by comparing the integrated value $\Sigma(A1/A0)$ of the acceleration factor ratios with a threshold. Specifically, the controller 5 determines whether or not the integrated value $\Sigma(A1/A0)$ of the acceleration factor ratios is equal to or larger than a product of the thermal shock test cycle number N0 and a margin. The margin is a constant set in view of safety and having a value equal to or smaller than 1. While an example in which the margin is 1 is presented herein, the value of the margin can be changed as appropriate depending on the use of the electrical appliance. If the integrated value $\Sigma(A1/A0)$ of the acceleration factor ratios is not equal to or larger than the product of the thermal shock test cycle number N0 and the margin, and the determination result in step S12 is No, the process is terminated. If the integrated value $\Sigma(A1/A0)$ of the acceleration factor ratios is equal to or larger than the product of the thermal shock test cycle number N0 and the margin, and the determination result in step S12 is Yes, the controller 5 forcibly stops the electrical appliance in step S13. During forced stop, even when a user performs an operation to start the operation of the electrical appliance, the controller 5 does not accept the user operation, and does not start the operation of the electrical appliance. In this manner, when the integrated value $\Sigma(A1/A0)$ of the acceleration factor ratios has become equal to or larger than the threshold, the controller 5 stops driving of the heater 7 and the motor 9, which are loads. In step S14, the controller 5 displays an alarm indicating the forced stop on the display 4. In this manner, when the integrated value $\Sigma(A1/A0)$ of the acceleration factor ratios has become equal to or larger than the threshold, the controller 5 causes the display 4 to provide an error display.

For example, when the actual acceleration factor A1 and the reference acceleration factor A0 are equal to each other in all of the calculations each performed for each one actual operation, the acceleration factor ratio A1/A0=1 is obtained, and the integrated value $\Sigma(A1/A0)$ of the acceleration factor ratios after n cycles is n. Thus, when the margin is 1, it is determined whether or not the number n of cycles of actual operations exceeds the thermal shock test cycle number N0 at which a crack 23 is generated in the solder joint. When the actual temperature condition is the same as the reference temperature condition, it can be estimated that a crack 23 will be generated when the number n of cycles of actual operations exceeds the thermal shock test cycle number N0.

When the actual acceleration factor A1 calculated for each one actual operation is half the value of the reference acceleration factor A0, the acceleration factor ratio A1/A0=0.5 is obtained, and the timing when the integrated value $\Sigma(A1/A0)$ of the acceleration factor ratios after n cycles becomes equal to the thermal shock test cycle number N0 is therefore when 2n=N0. Thus, when the actual temperature condition is more moderate than the reference temperature condition, a crack 23 can be estimated to be generated after the number of cycles of actual operations has become larger than the thermal shock test cycle number N0. In this example, when the margin is 1, a crack 23 can be estimated to be generated in a solder joint when the number n of cycles of actual operations exceeds twice the number of the thermal shock test cycle number N0.

In addition, assume that the actual acceleration factor A1 for each one actual operation is twice the value of the reference acceleration factor A0. In this case, the acceleration factor ratio A1/A0=2 is obtained, and the timing when the integrated value $\Sigma(A1/A0)$ of the acceleration factor ratios after n cycles becomes equal to the thermal shock test cycle number N0 is therefore when n=N0/2. Thus, when the actual temperature condition is severer than the reference temperature condition, it is estimated that a crack 23 can be generated in a state in which the number of cycles of actual operations is smaller than the thermal shock test cycle number N0. In this example, when the margin is 1, a crack 23 can be estimated to be generated when the number n of cycles of actual operations exceeds ½ of the thermal shock test cycle number N0.

The control device 10 including the solder joint life predictor according to the first embodiment is capable of predicting the lives of solder joints in all electronic components installed on an electronic circuit, which enables an electrical appliance to be stopped before a crack 23 grows and causes extended damage, and enables improvement in the safety of the electrical appliance. In addition, this facilitates identification of a cause of failure of an electrical appliance by a serviceperson, shortens the time for investigation of the cause of failure, and reduces the risk of errors in repair.

The functions of the controller 5 of the solder joint life predictor according to the embodiment described above are implemented by processing circuitry. The processing circuitry may be dedicated hardware, or a processing device that executes programs stored in a memory.

Figure 5:
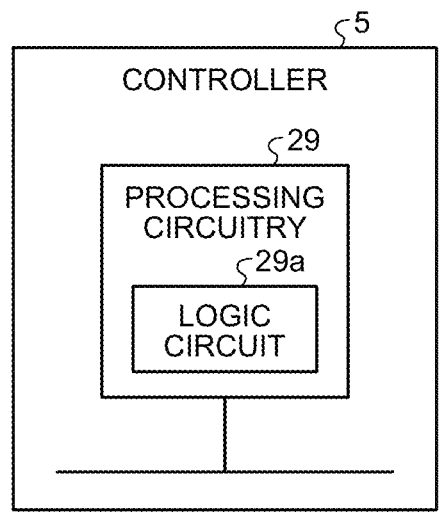
FIG. 5 is a diagram illustrating a configuration for implementing the functions of a controller of the solder joint life predictor according to the first embodiment by hardware.

In a case where the processing circuitry is dedicated hardware, the processing circuitry is a single circuit, a composite circuit, a programmed processor, a parallel-programmed processor, an application specific integrated circuit, a field programmable gate array, or a combination thereof. FIG. 5 is a diagram illustrating a configuration for implementing the controller of the solder joint life predictor according to the first embodiment by hardware. The processing circuitry 29 incorporates a logic circuit 29a for implementing the functions of the controller 5.

In a case where the processing circuitry 29 is a processing device, the functions of the controller 5 are implemented by software, firmware, or a combination of software and firmware.

Figure 6:
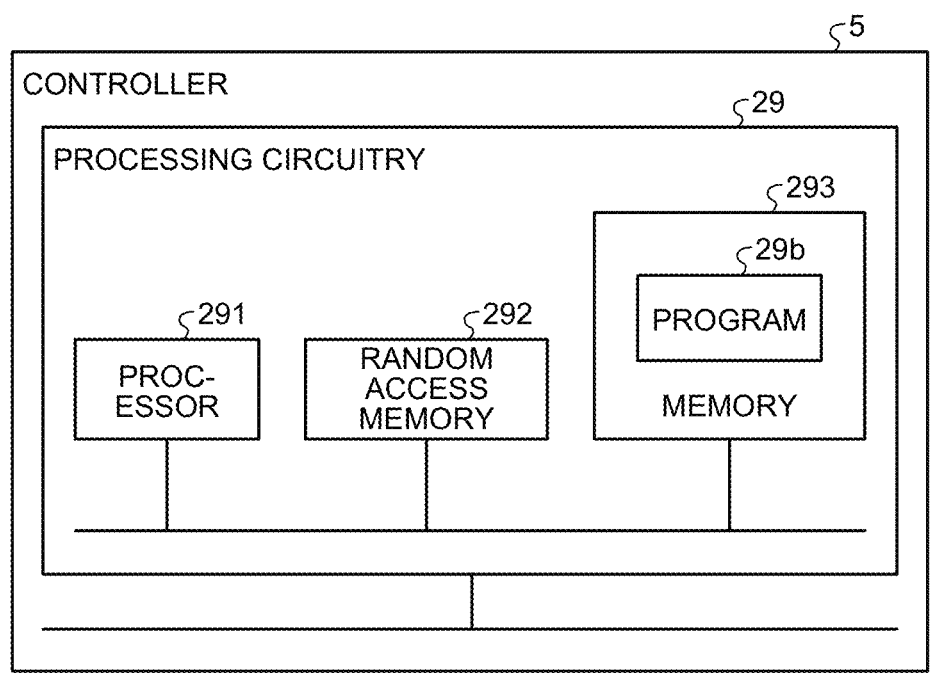
FIG. 6 is a diagram illustrating a configuration for implementing the functions of a controller of the solder joint life predictor according to the first embodiment by software.

FIG. 6 is a diagram illustrating a configuration for implementing the controller of the solder joint life predictor according to the first embodiment by software. The processing circuitry 29 includes a processor 291 that executes programs 29b, a random access memory 292 used as a work area by the processor 291, and a memory 293 that stores the programs 29b. The functions of the controller 5 are implemented by the processor 291 by loading the programs 29*b* stored in the memory 293 in the random access memory 292 and executing the programs 29*b*. The software or firmware is described in a programming language, and stored in the memory 293. The processor 291 can be a central processing unit, for example, but is not limited thereto. For the memory 293, a semiconductor memory such as a random access memory (RAM), a read only memory (ROM), a flash memory, an erasable programmable read only memory (EPROM), or an electrically erasable programmable read only memory (EEPROM: registered trademark) is applicable. The semiconductor memory may be a nonvolatile memory or may be a volatile memory. Alternatively, for the memory 293, a magnetic disk, a flexible disk, an optical disk, a compact disk, a mini disc, or a digital versatile disc (DVD) is applicable instead of a semiconductor memory. Note that the processor 291 may output and store data such as computation results into the memory 293, or store such data into an auxiliary memory, which is not illustrated, via the random access memory 292.

The processing circuitry 29 implements the functions of the controller 5 by reading and executing the programs 29*b* stored in the memory 293. In other words, the programs 29*b* cause a computer to execute the procedures and the methods implementing the functions of the controller 5.

Note that the processing circuitry 29 may implement some of the functions of the controller 5 by dedicated hardware, and others by software or firmware.

As described above, the processing circuitry 29 is capable of implementing the above-described functions by hardware, software, firmware, or a combination thereof.

The configurations presented in the above embodiment are examples of the present invention, and can be combined with other known technologies or can be partly omitted or modified without departing from the scope of the present invention.

REFERENCE SIGNS LIST 1 alternating-current power supply; 2 power supply circuit; 3 temperature sensor; 4 display; 5 controller; 6 heater driving circuit; 7 heater; 8 motor driving circuit; 9 motor; 10 control device; 20 conductor pattern; 21 pin; 22 solder; 23 crack; 29 processing circuitry; 29*a* logic circuit; 29*b* program; 51 storage; 52 calculator; 53 determiner; 291 processor; 292 random access memory; 293 memory.

The invention claimed is:

1. A solder joint life predictor comprising:
   a temperature sensor to measure temperature of a solder joint on an electronic circuit board that drives a load;
   a storage to store a reference acceleration factor, the reference acceleration factor being an acceleration factor based on a test condition of a thermal shock test of an electrical appliance including the electronic circuit board and a reference condition in an environment in which the electrical appliance is used;
   a calculator to calculate an actual acceleration factor on the basis of a temperature variation range and a maximum reached temperature of the solder joint during one cycle from start to end of driving of the load, and to integrate acceleration factor ratios each obtained by dividing the actual acceleration factor by the reference acceleration factor for each one cycle from start to end of driving of the load to obtain an integrated value of the acceleration factor ratios; and
   a determiner to predict life of the solder joint by comparing the integrated value of the acceleration factor ratios with a threshold.

2. The solder joint life predictor according to claim 1, wherein the threshold is a limit number of cycles in the thermal shock test.

3. The solder joint life predictor according to claim 2, wherein the determiner stops driving of the load when the integrated value of the acceleration factor ratios is equal to or larger than the threshold.

4. The solder joint life predictor according to claim 3, further comprising:
   a display to indicate information, wherein
   the determiner causes the display to provide an error display when the integrated value of the acceleration factor ratios is equal to or larger than the threshold.

5. The solder joint life predictor according to claim 2, further comprising:
   a display to indicate information, wherein
   the determiner causes the display to provide an error display when the integrated value of the acceleration factor ratios is equal to or larger than the threshold.

6. The solder joint life predictor according to claim 1, wherein the threshold is a constant multiple of a limit number of cycles in the thermal shock test.

7. The solder joint life predictor according to claim 6, wherein the determiner stops driving of the load when the integrated value of the acceleration factor ratios is equal to or larger than the threshold.

8. The solder joint life predictor according to claim 7, further comprising:
   a display to indicate information, wherein
   the determiner causes the display to provide an error display when the integrated value of the acceleration factor ratios is equal to or larger than the threshold.

9. The solder joint life predictor according to claim 6, further comprising:
   a display to indicate information, wherein
   the determiner causes the display to provide an error display when the integrated value of the acceleration factor ratios is equal to or larger than the threshold.

10. The solder joint life predictor according to claim 1, wherein the determiner stops driving of the load when the integrated value of the acceleration factor ratios is equal to or larger than the threshold.

11. The solder joint life predictor according to claim 10, further comprising:
    a display to indicate information, wherein
    the determiner causes the display to provide an error display when the integrated value of the acceleration factor ratios is equal to or larger than the threshold.

12. The solder joint life predictor according to claim 1, further comprising:
    a display to indicate information, wherein
    the determiner causes the display to provide an error display when the integrated value of the acceleration factor ratios is equal to or larger than the threshold.

13. A solder joint life prediction method comprising:
    measuring temperatures of a solder joint on an electronic circuit board that drives a load from start to end of driving of the load, and calculating an actual acceleration factor from a temperature variation range and a maximum reached temperature of the solder joint;
    obtaining an acceleration factor ratio by dividing the actual acceleration factor by a reference acceleration factor, the reference acceleration factor being an acceleration factor based on a test condition in a thermal shock test of an actual appliance and a reference condition in an environment in which an electrical appliance including the electronic circuit board is used;
integrating the acceleration factor ratios to calculate an integrated value of the acceleration factor ratios; and
predicting life of the solder joint by comparing the integrated value of the acceleration factor ratios with a threshold.

* * * * *